W. B. ALLEN.
Hand-Truck.

No. 207,473.  Patented Aug. 27, 1878.

WITNESSES
E. Nottingham
A. W. Bright

INVENTOR
Wm B. Allen
By H. A. Seymour
ATTORNEY

UNITED STATES PATENT OFFICE.

WILLIAM B. ALLEN, OF ORLEANS, NEW YORK.

IMPROVEMENT IN HAND-TRUCKS.

Specification forming part of Letters Patent No. 207,473, dated August 27, 1878; application filed July 13, 1878.

*To all whom it may concern:*

Be it known that I, WILLIAM B. ALLEN, of Orleans, in the county of Ontario and State of New York, have invented certain new and useful Improvements in Hand-Trucks; and I do hereby declare the following to be a full, clear, and exact description of the invention, such as will enable others skilled in the art to which it pertains to make and use it, reference being had to the accompanying drawings, which form part of this specification.

My invention relates to certain improvements in hand-trucks; and is designed especially for moving light bulky articles, such as mill-bags and similar packages.

It consists, first, of a truck adapted to take on its load from the side of the latter, rather than from its bottom. This causes the work of loading to be done in a much quicker and easier manner, and also allows the load to be unshipped without manual interference, while at the same time it is left standing in good upright position.

The invention consists, secondly, in providing means whereby the truck may be adapted to be used as an ordinary truck for transporting heavy articles, such as boxes and similar matter.

Figure 1:
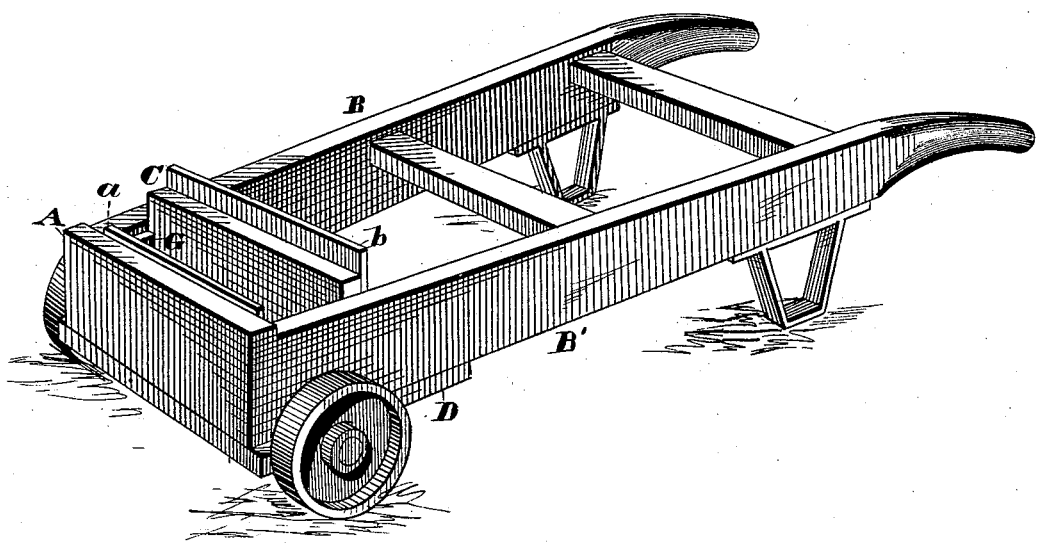
Figure 2:
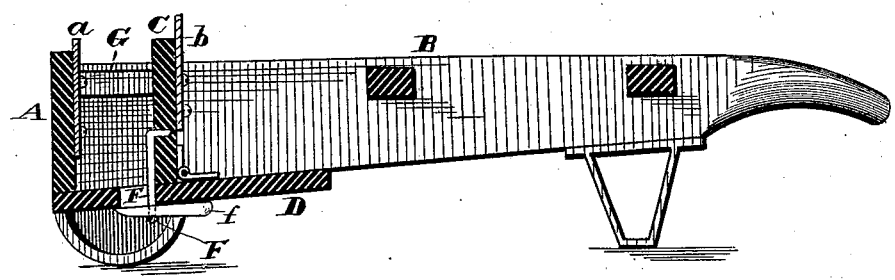

In the drawings, Figure 1 is a view, in perspective, of a truck embodying my invention. Fig. 2 is a view of the same in sectional side elevation.

The main body of the truck may be of any desired construction and material. It is provided with a lower nose, A, which projects forwardly beyond the sides B of the truck. At any suitable point above this lower nose the secondary or upper nose, C, is hinged to the cross-slat D. It projects forwardly any desired distance beyond the truck sides, and also beyond the lower nose. Both of these noses are preferably provided with sheet-metal working-plates, *a* and *b*, respectively secured to their upper sides and extending outwardly in front of said noses.

When a load is to be taken the truck is run up in front of the same and tilted in an upright position, so that the upper nose thereof may be in contact with the side of the bag or other article. The same is then pulled over into the truck, and the latter tilted downward and backward, so as to cause the load, by engagement with the said upper nose, to be fairly taken onto the truck, when it is carried off as usual. The load rests on its side against the two truck-noses, and is not supported from its immediate bottom at all. As both these noses project beyond the truck sides, and as the upper one projects farther than the lower one, it is evident that while the latter is of service in bearing the load the first and heaviest service is performed by the upper nose. Not only does this construction permit of the load being taken in much less time, with fewer movements, and at a less expenditure of strength, but also it permits of the load being unshipped in a very easy manner without manipulation of the same, and at the same time so as to leave the bag or other article standing in a good upright position. The reason of this consists in the fact that the bottom of the load is free from engagement with the truck; and since the load is supported thereon solely by side engagement, the release of the latter places the load in position the same as it occupies just before the truck ships it after being brought into an upright, or nearly upright, position.

If desired, I may form the upper nose rigid with its supporting cross-slat, so that it cannot be folded back out of the way; but my invention also includes this upper nose when hinged to the truck-bed.

In carrying out this part of the invention, I secure the nose to the slat by any suitable hinge, E, adapted to allow the same to be folded against the truck-bed. A loop-catch, F, secured to said nose, extends rearwardly, and is adapted to be engaged by a pin, *f*, or other suitable device. This fastening causes the nose to be held in operative position, while supports G, secured respectively to the two truck sides, provide bearings for the nose when in use, so as to prevent any strain from falling on the hinge-joint.

Having fully described my invention, what I claim as new, and desire to secure by Letters Patent, is—

1. A hand-truck provided with a nose formed thereon at a point in the rear of its forward end, whereby the truck is adapted, when in upright position, to take its load from the side of the latter, and without engagement with the bottom of the same, substantially as set forth.

2. A hand-truck constructed with a nose formed thereon at a point in rear of its forward extremity, and a second nose formed in rear of the same, said two noses being adapted to cause the truck to deposit its load so as to leave the latter in an upright position without manual interference, substantially as set forth.

3. A hand-truck constructed with a secondary nose, formed above the lower nose thereof, substantially as set forth.

4. A hand-truck provided with a secondary nose, placed above the lower nose, and adapted to be folded against the truck-bed when not in use, substantially as set forth.

5. In a hand-truck, the combination, with the hinged nose, of suitable supports formed on the truck sides, and adapted to provide bearing for the said nose when in operative position, substantially as set forth.

6. In a hand-truck, the combination, with the hinged nose, of a fastening device adapted to secure the same in operative position, substantially as set forth.

7. A hand-truck constructed with an upper or secondary nose and a lower nose, the latter being adapted to project forwardly beyond the truck's sides in a horizontal plane above the floor or ground when the truck is in an upright position, while at the same time the said upper nose projects forwardly beyond the lower nose, substantially as set forth.

In testimony that I claim the foregoing I have hereunto set my hand and seal this 9th day of July, 1878.

WILLIAM B. ALLEN. [L. S.]

Witnesses:
E. T. GRANT,
S. CULVER.